United States Patent [19]

Robbins

[11] 4,276,018

[45] Jun. 30, 1981

[54] MOBILE HEATER

[75] Inventor: Melvin E. Robbins, Cincinnati, Ohio

[73] Assignee: Davey Compressor Co., Cincinnati, Ohio

[21] Appl. No.: 43,791

[22] Filed: May 30, 1979

[51] Int. Cl.³ .................... F23D 15/02; F02C 1/00
[52] U.S. Cl. ........................................ 431/352; 60/757
[58] Field of Search ................. 431/352, 350, 351; 60/39.65

[56] References Cited

U.S. PATENT DOCUMENTS

| 2,461,731 | 2/1949 | Guth | 431/352 |
|---|---|---|---|
| 2,485,207 | 10/1949 | Logan | 431/352 |
| 2,654,219 | 10/1953 | Zaba | 431/352 |
| 3,589,127 | 6/1971 | Kenworthy | 431/352 |
| 3,593,518 | 7/1971 | Gerrard | 60/39.65 |
| 3,937,007 | 2/1976 | Kappler | 60/39.65 |
| 3,981,142 | 9/1976 | Irwin | 431/352 |
| 4,021,186 | 5/1977 | Tenner | 60/39.65 |
| 4,052,844 | 11/1977 | Caruel et al. | 431/352 |
| 4,054,028 | 10/1977 | Kawaguchi | 60/39.65 |
| 4,113,425 | 9/1978 | Linde et al. | 60/39.65 |

Primary Examiner—Daniel J. O'Connor
Attorney, Agent, or Firm—Kinney & Schenk

[57] ABSTRACT

A mobile heater for aerospace ground equipment includes a diesel engine for continuously driving a centrifugal blower for introducing air into a plenum chamber so that the air is not contaminated by the diesel engine. The diesel fuel is utilized with a unique burner arrangement, which enables burning within a burner body or can without build up of carbon, having a portion of the air supplied to the plenum chamber supplied thereto. The hot products of combustion from the burner arrangement flow into a core of a heat exchanger where they are directed through longitudinal spiral slots which terminate inside of a shell of the heat exchanger from which they are vertically exhausted upwardly through an exhaust stack. Ventilating air from the plenum chamber is directed through a nest of formed arcuate tubes, which have common walls with the longitudinal spiral slots whereby heat is transferred through the common walls to heat the ventilating air. Flexible ducts supply the heated air from the heat exchanger to aerospace ground equipment. The fuel supplied to the burner arrangement is stopped when the heated air exceeds a predetermined temperature or when there is no flame for a predetermined period of time or when there is no air flow from the blower during operation of the diesel engine.

9 Claims, 15 Drawing Figures

MOBILE HEATER

In mobile heaters for aerospace ground equipment, one means of supplying heat has been to employ a gasoline engine for driving the blower with gasoline from the same supply tank being utilized to produce the heat. The volatility of gasoline has created the dangers of explosion and/or fire. Thus, the use of gasoline as a single fuel for both the engine for driving the air moving means and for the burner producing heat for the ventilating air has inherent dangers.

In prior heaters, the air intake has passed over the engine to pre-heat the air. However, this has the danger of introducing contaminated air into the area to which the heated air is supplied.

The self-contained mobile heater of the present invention is an improvement of the prior heaters in that diesel fuel rather than gasoline is utilized. This has less volatility so there is less possibility of explosion and/or fire.

The heater of the present invention is arranged so that no air is drawn from the area around the diesel engine. Thus, there is no possible carbon monoxide contamination of the heated air.

The present invention provides a unique burner design in which there is no carbon build up of any significance within the burner body. Thus, the flame does not have its shape altered by any carbon build up. Furthermore, the downtime of the heater is reduced because of the absence of any need to clean the burner body to remove carbon.

The present invention also incorporates safety features within the heater so that fuel supply to the burner can or body is automatically stopped under certain conditions even though the fuel is continued to be supplied by the same pump, which supplies the fuel to the burner can, to the diesel engine to enable it to continue to operate. These conditions are that the temperature of the heated air exceeds a predetermined temperature, that there is no flame produced within the burner can or body within a predetermined period of time, and that air is not being supplied to the burner can or body. Any of these conditions will stop the flow of fuel to the nozzle injecting the diesel fuel into the burner can or body. This prevents any build up of the diesel fuel within the burner can or body so that there will be no explosion or fire due to the accumulated diesel fuel within the burner can or body when ignition again occurs.

The present invention has unique means for detecting the presence of the flame in cooperation with the fuel igniter. Thus, the fuel igniter utilizes a high voltage electrode and a ground electrode to cause ignition of the fuel with the same ground electrode cooperating with a sensing electrode to have current flow therebetween when there is a flame present between the ground electrode and the sensing electrode.

An object of this invention is to provide a self-contained mobile heater in which carbon monoxide from the fan driving means does not enter the air to be heated.

Another object of this invention is to provide a self-contained mobile heater for aerospace ground equipment.

A further object of this invention is to provide a unique burner arrangement for a heater.

Still another object of this invention is to provide a unique fuel igniter and flame detector.

Other objects, uses, and advantages of this invention are apparent upon a reading of this description which proceeds with reference to the drawings forming part thereof and wherein:

Figure 1:
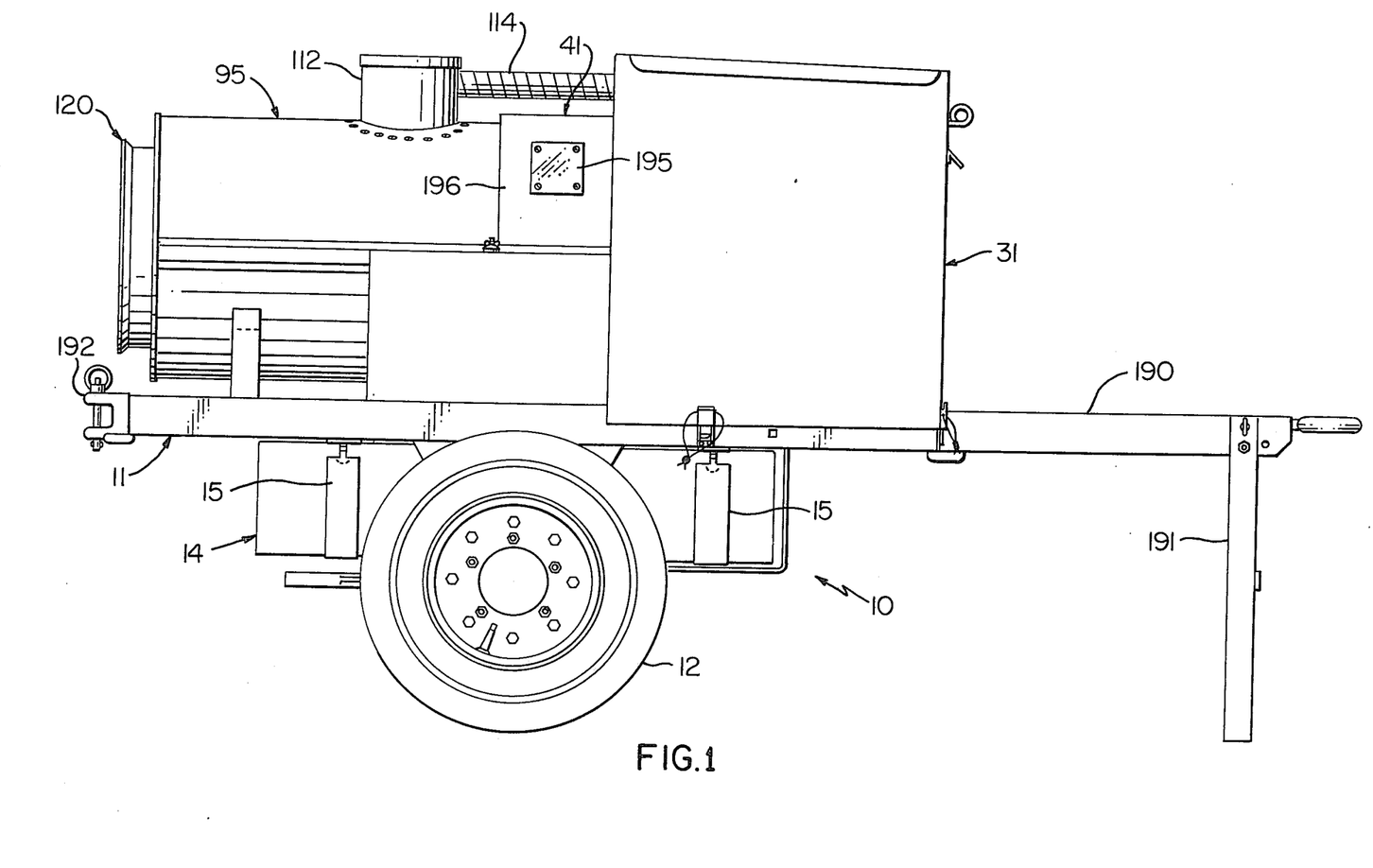
FIG. 1 is a side elevational view of the mobile heater of the present invention.
Figure 2:
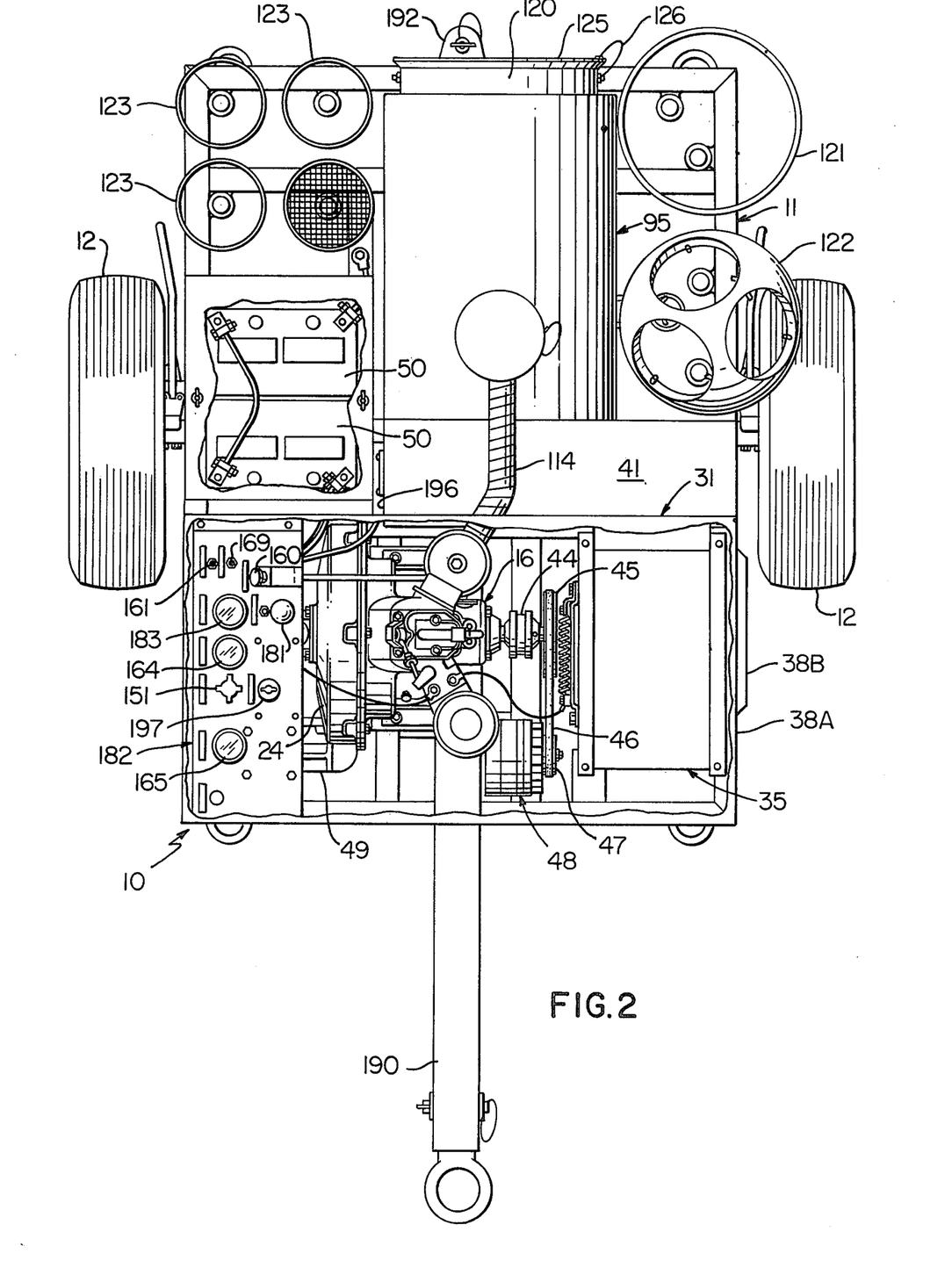
FIG. 2 is a top plan view of the mobile heater of FIG. 1 with some parts broken away.

Referring to the drawings and particularly FIGS. 1 and 2, there is shown a self-contained mobile heater 10 of the present invention. The heater 10 includes a rectangular shaped frame 11 supported by a pair of wheels 12. The frame 11 has a diesel fuel tank 14 (see FIG. 1) supported therefrom by a pair of straps 15.

A single cylinder, four cycle diesel engine 16 (see FIG. 2) is supported through vibration isolation mounts (not shown) on the frame 11 of the heater 10. One suitable example of the diesel engine 16 is sold by Hatz Diesel of America, Inc., New Berlin, Wis. as model E 673.

Figure 3:
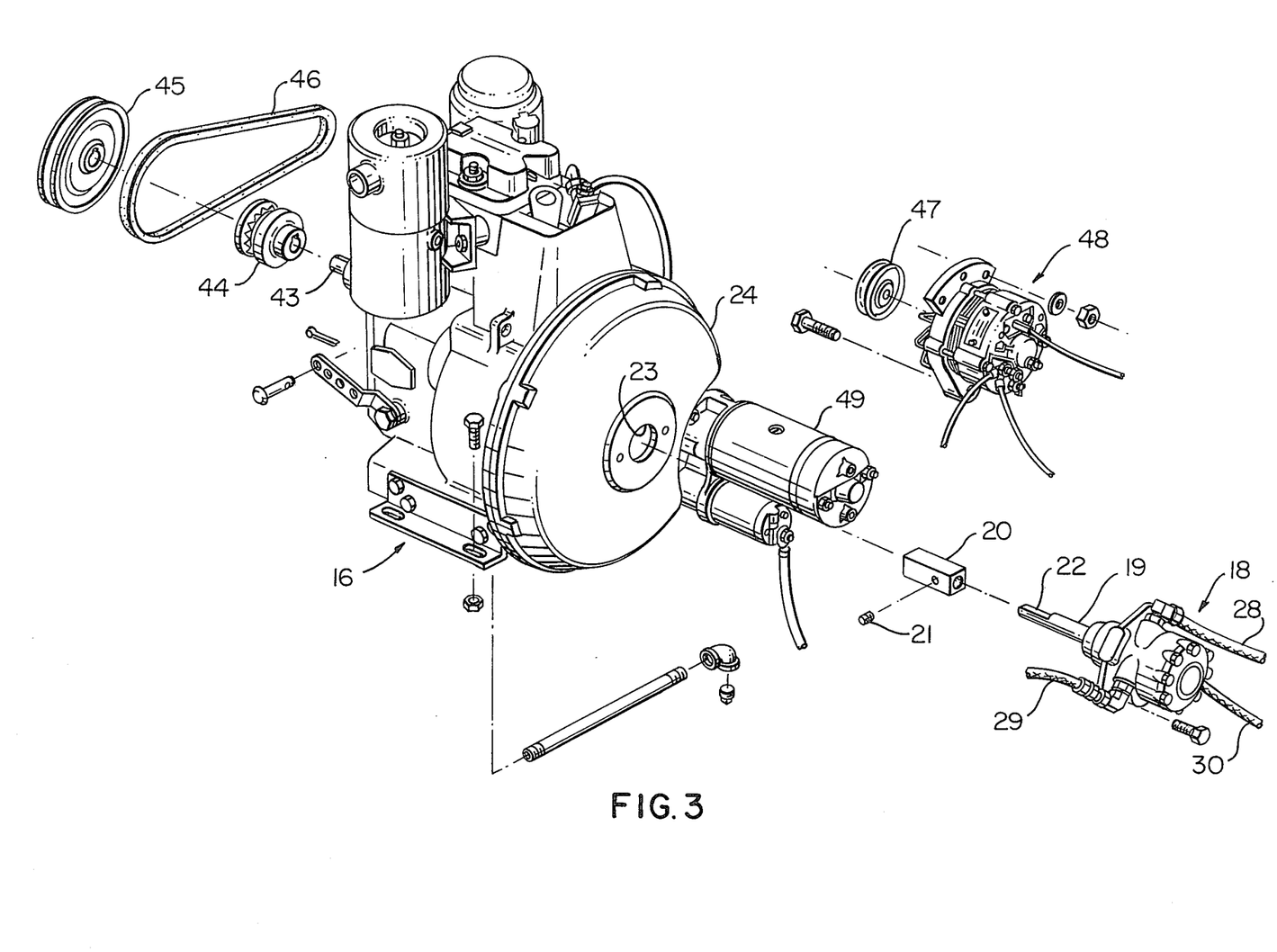
FIG. 3 is an exploded perspective view of a diesel engine, a diesel pump, and an alternator of the heater of the present invention.

Diesel fuel is supplied from the tank 14 to the diesel engine 16 by a diesel pump 18 (see FIG. 3). One suitable example of the pump 18 is sold by Sundstrand Hydraulics of Rockford, Ill. as model J6BA-159P. The pump 18 is driven from the diesel engine 16 through having a shaft 19 of the pump 18 connected to a steel coupling 20 of square shaped cross section by a set screw 21 cooperating with a flat 22 on the end of the shaft 19.

Figure 9:
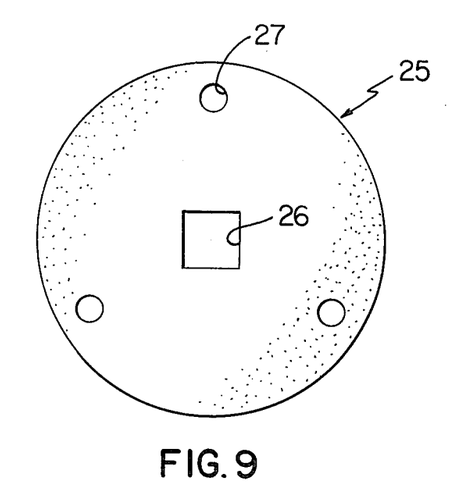
FIG. 9 is an end elevational view of a resilient coupling connected to the flywheel of the diesel engine.

The coupling 20 extends through an opening 23 in the flywheel housing 24, which has the pump 18 mounted thereon, for connection to a resilient coupling 25 (see FIG. 9), which is connected to a flywheel (not shown) within the flywheel housing 24 (see FIG. 3) of the diesel engine 16. The coupling 25 (see FIG. 9) has a square shaped opening 26 to receive the end of the coupling 20

(see FIG. 3). The coupling 25 (see FIG. 9) has three equally angularly spaced openings 27 to receive bolts (not shown) to secure the coupling 25 to the flywheel within the flywheel housing 24 (see FIG. 3) of the diesel engine 16. The coupling 25 (see FIG. 9) is formed of a flexible or resilient material. One suitable example of the material of the coupling 25 is Goodyear Compound No. 31-50-SCOR having nylon fabric impregnated therein.

The diesel fuel is supplied from the tank 14 (see FIG. 1) to the pump 18 (see FIG. 3) by a supply line 28. The pump 18 supplies the diesel fuel through a discharge line 29 to the diesel engine 16 and returns diesel fuel to the tank 14 (see FIG. 1) by a return line 30 (see FIG. 3).

A housing 31 (see FIGS. 1 and 2) is removably attached to the frame 11. A housing 31 encloses the diesel engine 16, the diesel pump 18, and other structure of the heater 10 including a centrifugal blower 35, which is continuously driven by the diesel engine 16. One suitable example of the blower 35 is sold by Lau Industries, Dayton, Ohio as model FGP10-6A.

Figure 4:
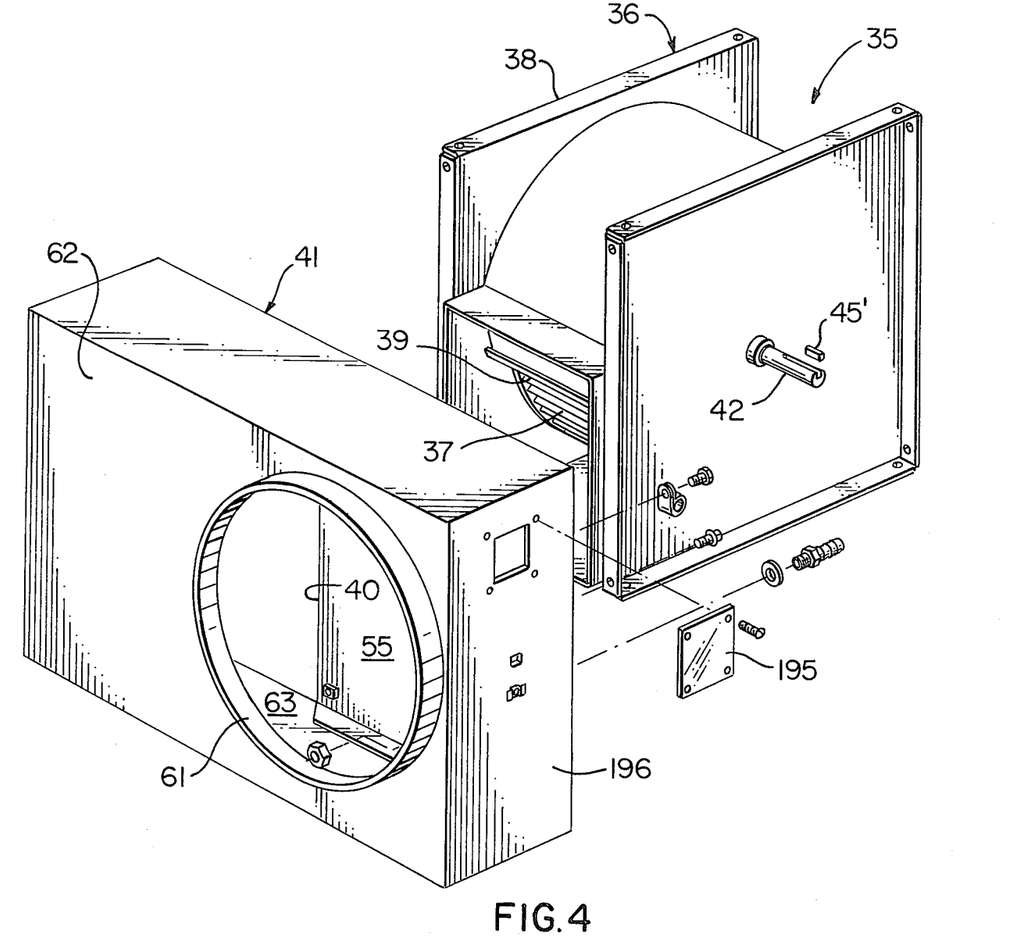
FIG. 4 is an exploded perspective view of a centrifugal blower and a plenum of the heater of the present invention.

As shown in FIG. 4, the blower 35 includes a housing 36 and a squirrel cage wheel 37 rotatably mounted in the housing 36. The housing 36 has air introduced through an opening in a wall 38 to the interior of the wheel 37. The wall 38 of the housing 36 abuts a wall 38A (see FIG. 2) of the housing 31 with the housing 31 having a louvered opening (The top louver is shown at 38B.) therein communicating with the opening in the wall 38 (see FIG. 4) of the housing 36 so that the air enters from an area remote from the diesel engine 16 (see FIG. 2). The air is supplied from the wheel 37 (see FIG. 4) through a rectangular shaped opening 39 in the housing 36 to a rectangular shaped opening 40 in a plenum 41, which is mounted on the frame 11 (see FIG. 2).

The wheel 37 (see FIG. 4) is driven from the diesel engine 16 (see FIG. 3) through a shaft 42 (see FIG. 4) of the wheel 37 being connected to an output shaft 43 (see FIG. 3) of the diesel engine 16 by a flexible coupling 44. The shaft 42 (see FIG. 4) is rotatably supported by the housing 36.

The shaft 42 has a sheave 45 (see FIG. 3) mounted thereon by a key 45' (see FIG. 4). A belt 46 (see FIG. 3) passes around the sheave 45 and around a sheave 47 on an alternator 48. Thus, the alternator 48 is driven from the diesel engine 16 (see FIGS. 2 and 3).

The diesel engine 16 is started by a starter 49 (see FIG. 3), which is supported on the diesel engine 16, being activated by a pair of batteries 50 (see FIG. 2). Thus, the diesel engine 16 is electrically started.

Figure 5:
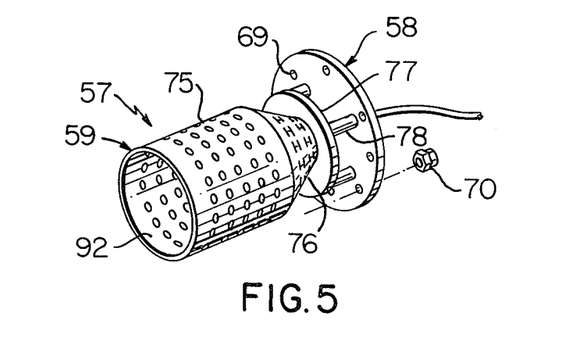
FIG. 5 is a perspective view of a burner assembly of the heater of the present invention.
Figure 6:
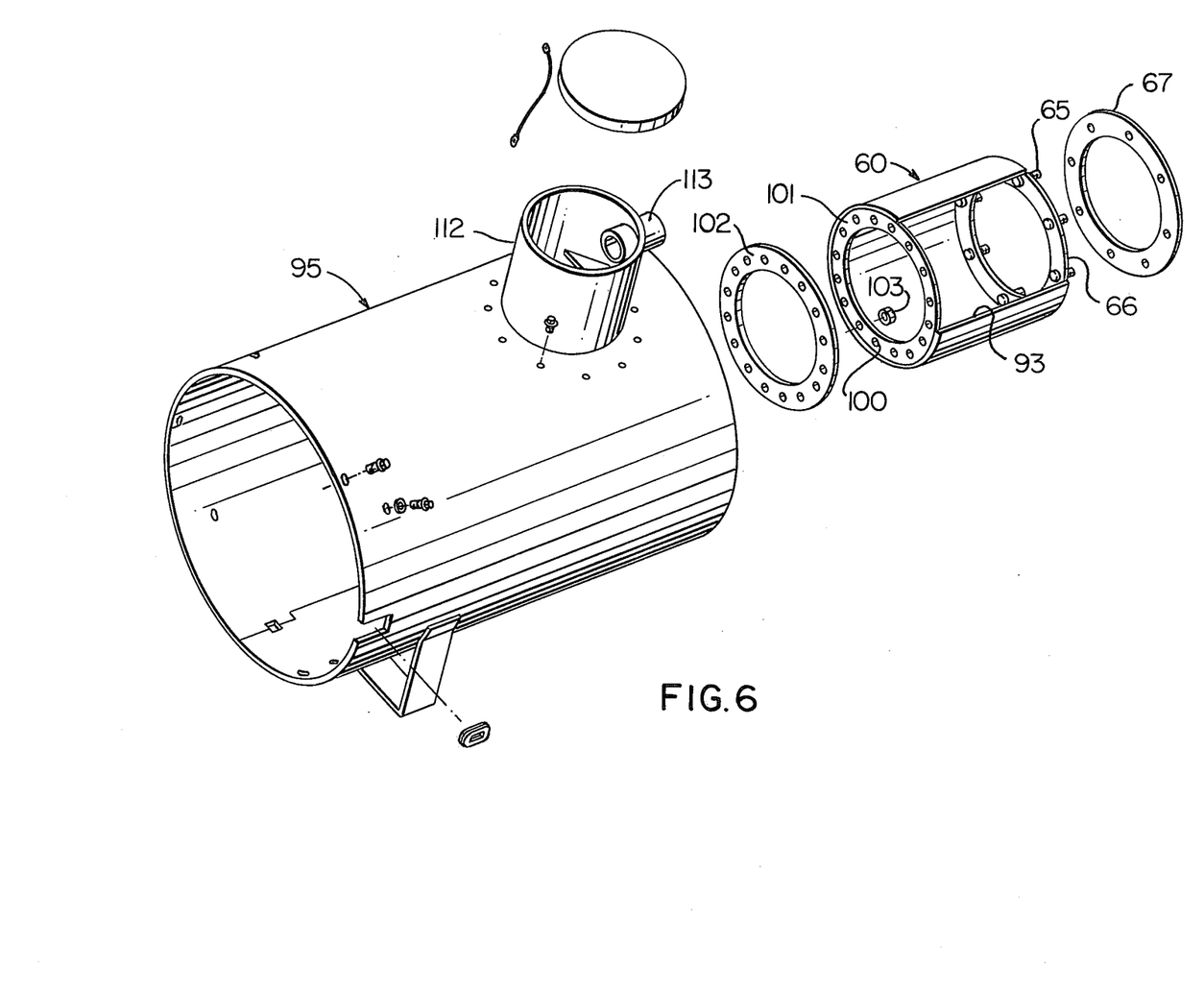
FIG. 6 is an exploded perspective view of a burner housing of the burner assembly of FIG. 5 and a heat exchanger housing.
Figure 10:
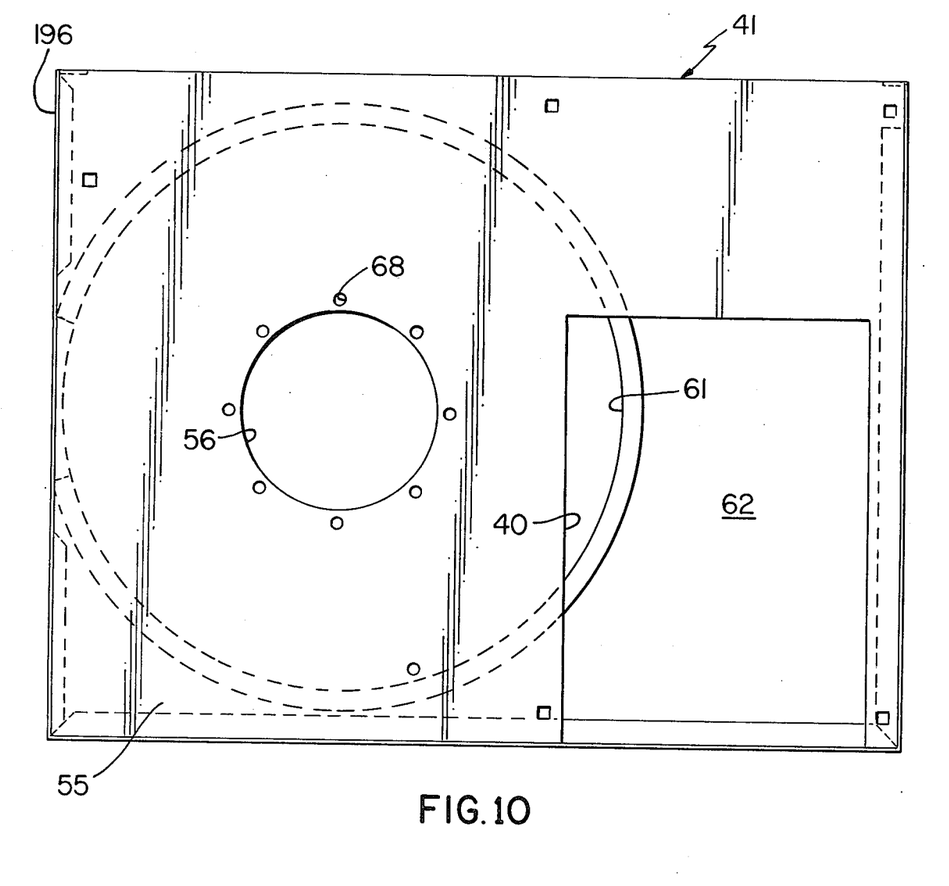
FIG. 10 is an end elevational view of the plenum of FIG. 4.

As shown in FIG. 10, the plenum 41 has a wall 55 within which the rectangular shaped opening 40 is formed along with a circular shaped opening 56 to receive portions of a burner assembly 57 (see FIG. 5). The burner assembly 57 includes a burner cover 58, a burner body or can 59, and a burner housing 60 (see FIG. 6).

The burner housing 60 extends through a circular shaped opening 61 (see FIG. 4) in a wall 62 of the plenum 41 so as to be disposed within a plenum chamber 63 of the plenum 41. Thus, air from the squirrel cage wheel 37 of the blower 35 enters the plenum chamber 63 through the opening 40 and exits therefrom through the opening 61 since the burner housing 60 (see FIG. 6) has a substantially smaller diameter than the opening 61 (see FIG. 4) in the wall 62 of the plenum 41.

The burner housing 60 (see FIG. 6) has threaded studs 65 equally angularly spaced on an annular plate 66 on one end thereof. A gasket 67 is supported on the studs 65 and bears against the inner surface of the wall 55 (see FIG. 10) of the plenum 41.

The studs 65 (see FIG. 6) extend through equally angularly spaced openings 68 (see FIG. 10) in the wall 55 of the plenum 41 for disposition within equally angularly spaced openings 69 (see FIG. 5) in the burner cover 58. Nuts 70 are threaded on the studs 65 so that the burner assembly 57 is supported on the plenum wall 55 (see FIG. 10).

Figure 11:
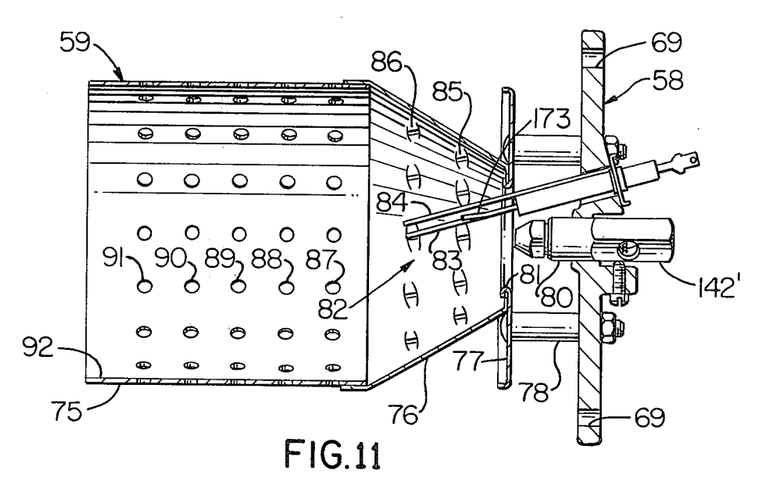
FIG. 11 is a sectional view of a burner body or can and a burner cover of the burner assembly of FIG. 5.

As shown in FIG. 11, the burner body or can 59 includes a hollow cylindrical portion 75 and a hollow truncated conical portion 76 secured to each other and disposed about a common longitudinal axis. The truncated conical portion 76 has an annular plate 77 (see FIGS. 5 and 11) supported at its smaller end and having four equally angularly spaced threaded studs 78 secured thereto. The threaded studs 78 are utilized to secure the burner body 59 to the burner cover 58 through having nuts (not shown) cooperating with the threaded studs 78 after the studs 78 extend through equally angularly spaced openings in the burner cover 58.

A nozzle 80 (see FIG. 11), which is supported on the burner cover 58, is disposed adjacent a circular shaped opening 81 at the smaller axial end of the truncated conical portion 76 to inject diesel fuel into the truncated conical portion 76 from the fuel tank 14 (see FIG. 1) by means of the fuel pump 18 (see FIG. 3). The diesel fuel is ignited within the truncated conical portion 76 (see FIG. 11) of the burner body 59 by an igniter 82, which includes a high voltage electrode 83 and a ground electrode 84. The igniter 82 is supported on the burner cover 58.

The truncated conical portion 76 has a first row of lanced ports 85 and a second row of lanced ports 86 formed at nonorthogonal angles to the bodies longitudinal axis in its wall to provide communication therethrough to allow air to flow into the interior of the truncated conical portion 76 from the plenum chamber 63 (see FIG. 4). The lanced ports 85 (see FIG. 11) are equally spaced from each other around the wall of the truncated conical portion 76, and the lanced ports 86 are equally spaced from each other around the wall of the truncated conical portion 76. The truncated conical portion 76 has the same number of the lanced ports 85 as the number of the lanced ports 86 with this preferably being thirteen. Each of the lanced ports 85 and 86 preferably has a width of $\frac{1}{4}''$ and is formed by bending portions of the wall of the truncated conical portion 76 $\frac{1}{8}''$ in each direction.

As an example, the over-all length of the truncated conical portion 76 along its longitudinal axis from the inlet end of the hollow cylindrical portion 75 to the plate 77 could be $2\frac{3}{8}''$ with the row of the lanced ports 86 being $\frac{3}{4}''$ from the inlet end of the hollow cylindrical portion 75 and the row of the lanced ports 85 being $1\frac{5}{8}''$ from the inlet end of the hollow cylindrical portion 75. The opening 81 would have a diameter of $1\frac{5}{8}''$.

The hollow cylindrical portion 75 has five rows of ports or holes 87, 88, 89, 90, and 91 in its wall. Each of the rows contains eighteen of the ports 87-91 with each of the ports 87-91 being the same diameter and equally spaced from each other in the same row. The total area of the ports 87-91 is greater than the total area of the lanced ports 85 and 86.

As an example, each of the ports 87-91 has a diameter of $\frac{1}{4}''$ with the centers of the ports 87-91 in adjacent rows being spaced 13/16'' from each other. The row of the ports 91 is spaced 1'' from the discharge end, which has a circular shaped discharge opening 92 of about 5" in diameter, of the cylindrical portion 75, which has an over-all length of 4⅞". The row of the ports 87 is ⅝" from the inlet end of the cylindrical portion 75 communicating with the opening at the large end of the truncated conical portion 76.

The burner housing 60 (see FIG. 6) is generally cylindrically shaped has an opening 93, which corresponds to a cylindrical sector of the housing 60. This opening 93 extends for 90° about the circumference of the burner housing 60, therein to admit air from the plenum chamber 63 (see FIG. 4) into the interior of the burner housing 65 (see FIG. 6) within which is positioned the burner body 59 (see FIG. 5). Accordingly, the air from the squirrel cage wheel 37 (see FIG. 4) of the centrifugal blower 35 entering the plenum chamber 63 not only exits through the opening 61 but also enters the interior of the burner housing 60 (see FIG. 6) through the opening 93 to supply air to the interior of the burner body 59 (see FIG. 11) through the lanced ports 85 and 86 and the ports 87-91 for combustion purposes.

The air flowing through the rows of the lanced ports 85 and 86 is the primary air used to produce combustion of the diesel fuel supplied to the interior of the truncated conical portion 76 from the nozzle 80. The lanced ports 85 and 86 are disposed at an angle to the axis of the burner body 59 to give the primary air a swivel or rotation as it enters the interior of the truncated conical portion 76. This produces more complete combustion since the swirl of the air produces more mixing with the spray of fuel supplied from the nozzle 80. Secondary combustion air is supplied through the rows of the ports 87, 88, and 89 to the interior of the hollow cylindrical portion 75.

The air flowing through the rows of the ports 90 and 91 cools the flame and provides further secondary combustion air. Thus, complete combustion occurs within the burner body 59 to prevent carbon build up therein.

The opening 61 (see FIG. 4) in the wall 62 of the plenum 41 communicates with the interior of a hollow cylindrical shaped heat exchanger housing 95 (see FIG. 6), which is secured to the plenum 41 (see FIG. 4) by suitable means such as by fitting over a ring 95', which defines the opening 61, extending from the wall 62 of the plenum 41, for example, so that air flows from the plenum chamber 63 through the opening 61 into the interior of the housing 95 (see FIG. 6) and is supported on the frame 11 (see FIG. 1). The housing 95 (see FIG. 6) has a cylindrical shaped heat exchanger assembly 96 (see FIG. 7) supported therein. One suitable example of the heat exchanger assembly 96 is sold by Davey Compressor Company as part number 68619.

Figure 12:
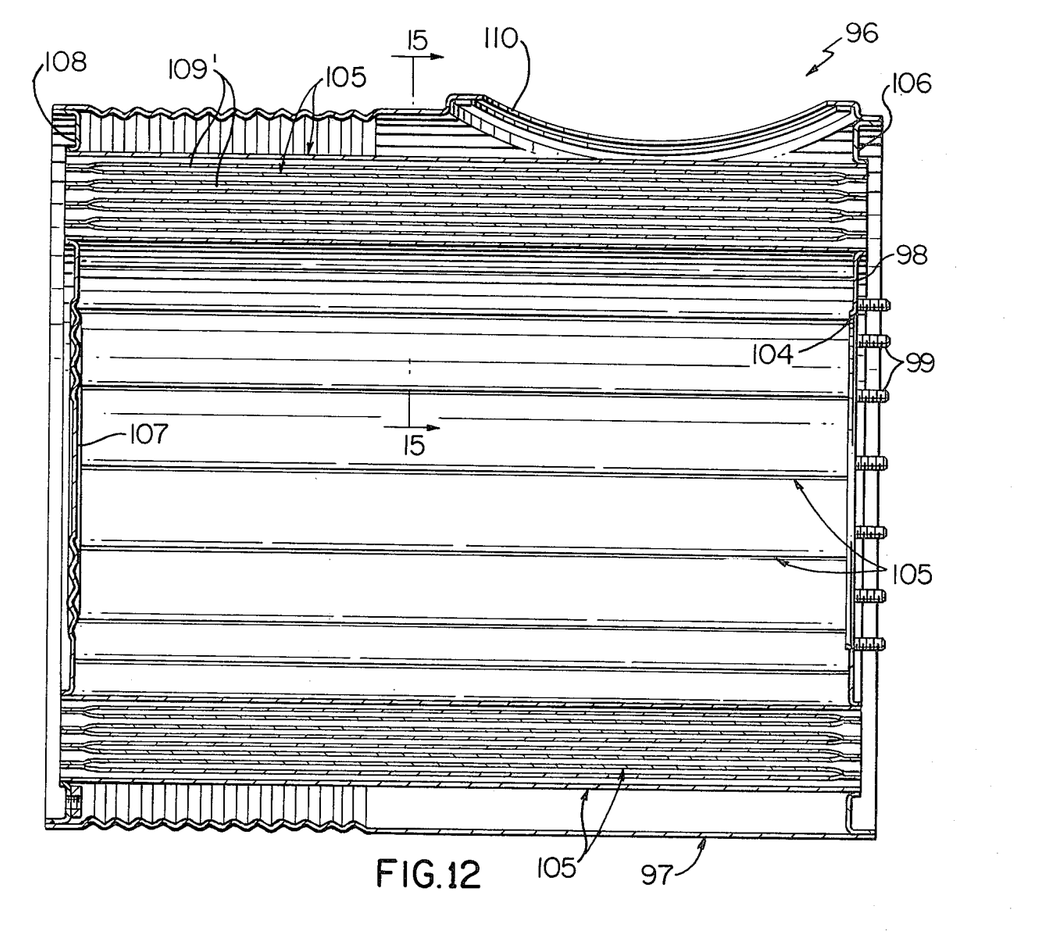
FIG. 12 is a sectional view of the heat exchanger assembly of FIG. 7.

As shown in FIG. 12, the heat exchanger assembly 96 includes a hollow cylindrical shell 97 having a plate 98 supported thereby at its air inlet end. The plate 98 has a plurality of threaded studs 99 thereon equally angularly spaced from each other. The studs 99 extend into openings 100 (see FIG. 6) of an annular plate 101 at the combustion discharge end of the burner housing 60 after having a gasket 102 mounted thereon. Nuts 103 secure the heat exchanger assembly 96 (see FIG. 7) to the burner housing 60 (see FIG. 6).

The annular plate 98 (see FIG. 12) has a circular shaped opening 104 receiving the discharge end of the burner body 59 (see FIG. 11) after the discharge end of the burner body 59 is extended through the annular plate 101 (see FIG. 6) and the gasket 102. This allows the hot products of combustion from the discharge opening 92 (see FIG. 11) of the burner body 59 to enter the opening 104 (see FIG. 12) in the annular plate 98 of heat exchanger assembly 96.

Air from the plenum chamber 63 (see FIG. 4) flows from the opening 61 in the wall 62 of the plenum 41 into the heat exchanger assembly 96 (see FIG. 12) through annular shaped tubes 105, which are supported at the air entrance end of the heat exchanger assembly 96 between the plate 98 and an arcuate plate 106 at the same end of the heat exchanger assembly 96 as the plate 98 and mounted on the inner surface of the shell 97. The tubes 105 are supported at the air discharge end of the heat exchanger assembly 96 between a solid plate 107 and an annular plate 108, which is mounted on the inner surface of the shell 97. Thus, the air entering the heat exchanger assembly 96 from the planum chamber 63 (see FIG. 4) flows only within the tubes 105 (see FIG. 12).

Figure 15:
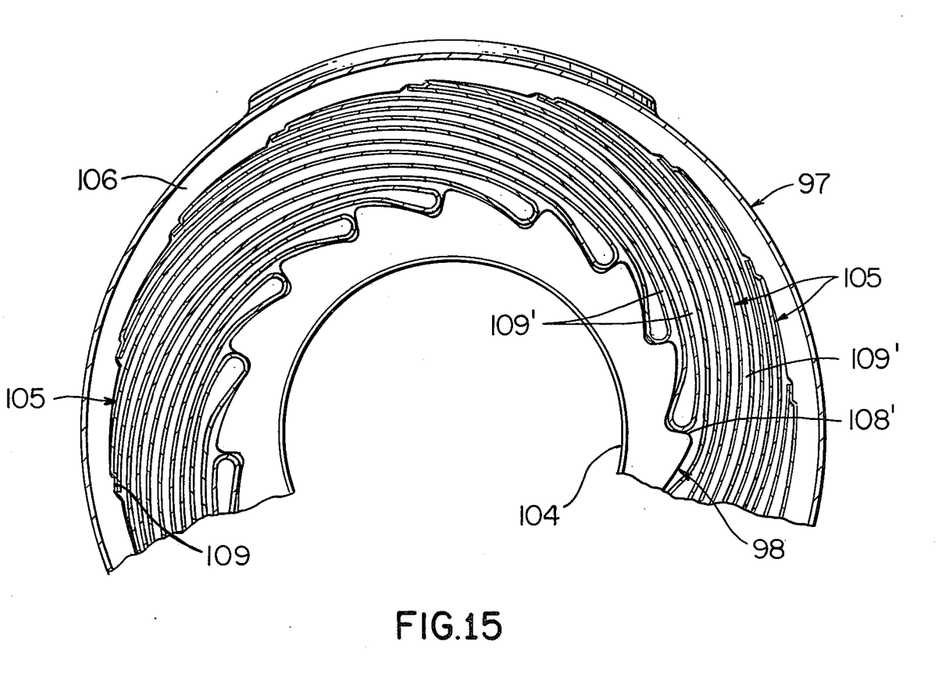
FIG. 15 is a fragmentary sectional view of a portion of the heat exchanger assembly of FIG. 7 and taken along line 15—15 of FIG. 12.

Each of the annular plate 98 and the solid plate 107 (see FIGS. 7 and 15) has its outer periphery formed with a plurality of steps 108'. Each of the annular plates 106 and 108 has its inner periphery formed with steps 109.

Each of the arcuate tubes 105 has its inner portion supported at opposite ends by one of the steps 108' on each of the annular plate 98 and the solid plate 107. The outer portion of each of the arcuate tubes 105 is supported at opposite ends by one of the steps 109 on each of the annular plates 106 and 108. This spaces the arcuate tubes 105 from each other to provide a plurality of passages 109' (see FIG. 15) therebetween whereby the passages 109' receive the products of the combustion passing through the opening 104.

Thus, each of the passages 109' is formed by a side wall of two of the adjacent arcuate tubes 105. These two adjacent side walls are pinched against each other adjacent each longitudinal end thereof to form a seal. Accordingly, the hot products of combustion from the burner body 59 (see FIG. 5) enter the opening 104 (see FIG. 12) in the annular plate 98 and then flow through the passages 109' (see FIG. 15) in heat exchange relation with the air, which enters the heat exchanger assembly 96 (see FIG. 12) through the tubes 105.

Therefore, the hot products of combustion flow axially into the interior of the heat exchanger assembly 96 and then flow radially therefrom through the passages 109'. At the same time, the air from the plenum chamber 63 (see FIG. 4) flows only axially through the tubes 105 (see FIGS. 12 and 15).

After being in heat exchange relation with air flowing through the tubes 105 from the plenum chamber 63 (see FIG. 4), the heated combustion air from the burner body 59 (see FIG. 5) is directed through an exhaust opening 100 (see FIG. 7) in the shell 97 of the heat exchanger assembly 96. A gasket 111 surrounds the circular shaped opening 110 to provide a seal with the inner surface of the housing 95 whereby the combustion air escapes to the atmosphere through a stack 112 on the housing 95. The stack 112 has a pipe 113 extending therefrom to receive the products of combustion from the diesel engine 16 (see FIG. 3) through a hose 114 (see FIG. 1).

Figure 7:
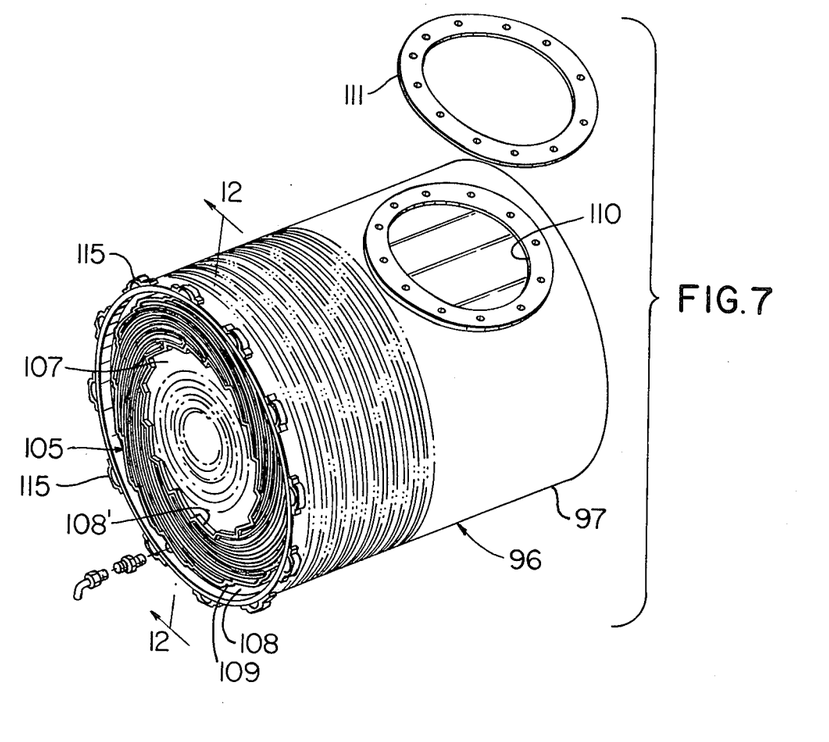
FIG. 7 is a perspective view of a heat exchanger assembly disposed in the heat exchanger housing of FIG. 6.

As shown in FIG. 7, the shell 97 has a plurality of equally angularly spaced spacers 115 on its outer surface to space the heat exchanger assembly 96 from the inner surface of the housing 95 (see FIG. 6) to form an annular air passage therebetween. Thus, air from the plenum chamber 63 (see FIG. 4) also flows along the exterior of the shell 97 (see FIG. 7) through this annular air passage.

This air enters a plurality of circumferentially spaced ducts 116 (see FIG. 8) in an air director 117, which is supported by the heat exchanger housing 95 (see FIG. 6) at the discharge end of the heat exchanger assembly 96 (see FIG. 7). The ducts 116 (see FIG. 8) extend radially inwardly to radially direct this relatively cool air to mix with the heated air flowing from the tubes 105 (see FIG. 7) in the heat exchanger assembly 96.

The air director 117 (see FIG. 8) includes a circular shaped deflector plate 118, which is secured to the ducts 116 adjacent their inner ends, in its center to deflect the air from the ducts 116 and from the tubes 105 (see FIG. 7) in the heat exchanger assembly 96 into spaces 119 (see FIG. 8) between the air ducts 116. The mixed air flowing through the spaces 119 then passes through a connector 120, which is supported by the heat exchanger housing 95 (see FIG. 6), for supply through flexible ducts 121 (see FIG. 2) to the aerospace ground equipment. There are two of the flexible ducts 121, which are 12" in diameter with each being 15' in length. Furthermore, an adapter 122 can be connected to the end of one of the two flexible ducts 121 to have three flexible ducts 123, which are 6" in diameter and 15' in length, connected thereto to distribute the heated air to different locations in the aerospace ground equipment being heated by the heater 10 of the present invention.

The connector 120 (see FIG. 8) has its opening 124 closed by a cover 125 when not being utilized. A lanyard 126 holds the cover 125 to the connector 120.

Figure 13:
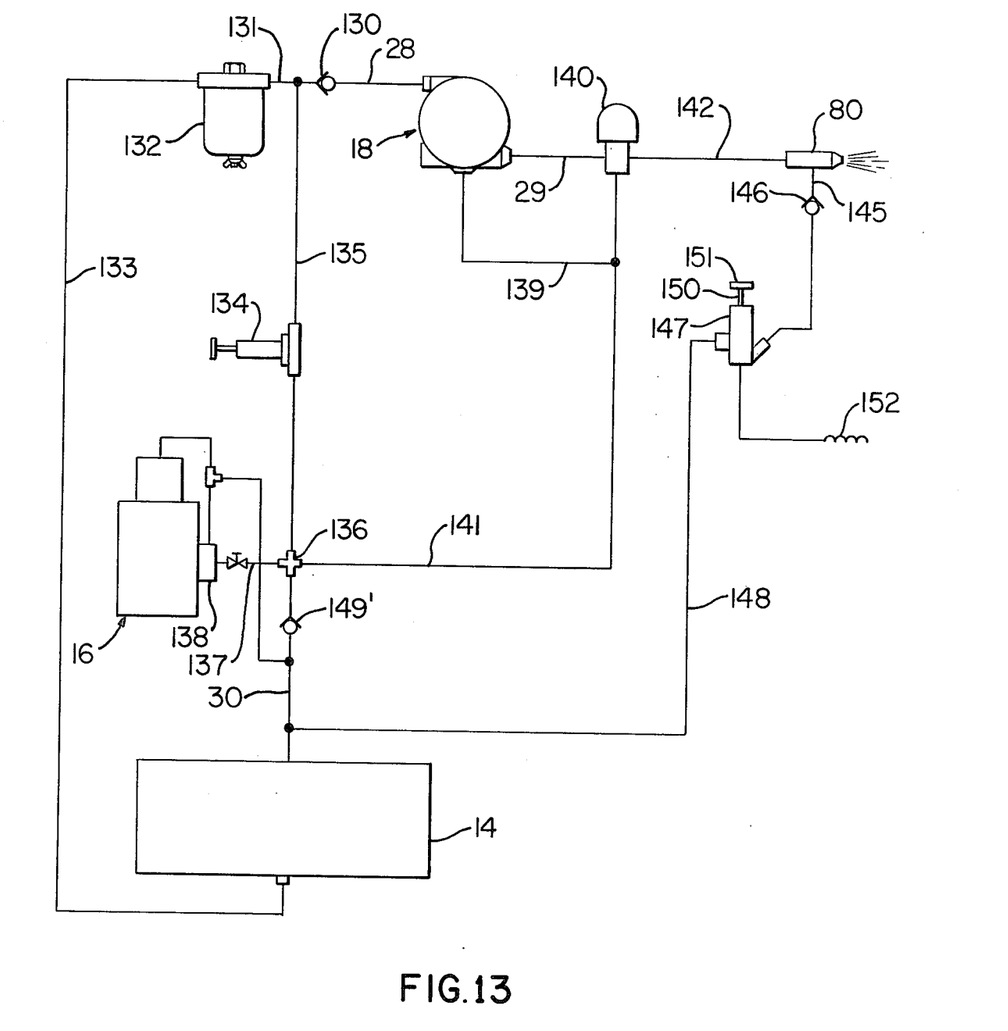
FIG. 13 is a schematic diagram of the fuel system for supplying fuel to both the diesel engine and the burner body or can.

As previously mentioned, the pump 18 (see FIG. 3) supplies diesel fuel to the diesel engine 16 through the fuel line 29 with the inlet of the pump 18 being connected to the tank 14 (see FIG. 1) by the supply fuel line 28 (see FIG. 3). As shown in FIG. 13, the supply line 28 is connected through a check valve 130, which is preferably a one pound check valve, a fuel line 131, a filter 132, and a fuel line 133 to the tank 14.

Priming of the engine is obtained through activating a primer pump 134 in a line 135, which connects the line 131 to a cross 136. The cross 136 has a line 137 connected to a fuel injection pump 138 of the diesel engine 16. Thus, activation of the primer pump 134 initially supplies diesel fuel to the diesel engine 16 for starting when the starter 49 (see FIG. 3) is activated. The check valve 130 (see FIG. 13) insures that the primer pump 134 draws the diesel fuel from the tank 14 rather than from the pump 18.

The pump 18 (see FIG. 13) has an interior by-pass line connected to a line 139. The pump 18 delivers fuel through the discharge line 29 to a solenoid valve 140, which is connected to the cross 136 through a line 141 when the solenoid valve 140 is not energized. The line 139 also is connected to the line 141.

When the solenoid valve 140 is energized, the discharge line 29 supplies the diesel fuel from the pump 18 through a fuel line 142 to the nozzle 80 while communication of the fuel line 29 with the fuel line 141 is blocked so the diesel fuel is supplied to the diesel engine solely through the interior by-pass line and the lines 139 and 141.

One suitable example of the nozzle 80 is a variflow nozzle sold by Delavan Corporation of West Des Moines, Iowa. Thus, the nozzle 80 is mounted in an adapter 142' (see FIG. 11) having an opening through which some of the diesel fuel from the line 142 (see FIG. 13) can flow to a line 145, which has a check valve 146 therein, rather than to the outlet of the nozzle 80. The check valve 146 is preferably a three pound check valve.

The line 145 communicates with a fuel control valve 147, which regulates the amount of fuel passing therethrough to return to the tank 14 through a line 148 and the line 30, which is connected to the cross 136 and has a check valve 149' therein. One suitable example of the fuel control valve 147 is sold by Davey Compressor Company, Cincinnati, Ohio as model 68723. The check valve 149' is preferably a three pound check valve.

The fuel control valve 147 has a stem 150, which is turned by a knob 151 attached thereto to control the temperature of the air produced by the heater 10 (see FIG. 1). The turning of the stem 150 (see FIG. 13) by the knob 151 changes the force of a spring within the valve 147.

The amount of fuel flowing from the line 145 to the line 148 through the fuel control valve 147 is responsive to a capillary tube 152, which has a fluid therein communicating with a diaphragm within the fuel control valve 147 to control the quantity of fuel flowing through the fuel control valve 147. Thus, as the temperature of the fluid within the capillary tube 152 increases due to the temperature of the heated air increasing, the diaphragm expands against the force of the spring, which has its force regulated by the stem, so that the fuel flow through the fuel control valve 147 is increased to reduce the amount of fuel supplied from the nozzle 80 to the burner body 59 (see FIG. 5).

The capillary tube 152 (see FIG. 13) is supported within the opening 124 (see FIG. 8) of the connector 120 by a pair of clips 154, which are mounted on a rod 155 extending diametrically across the opening 124 of the connector 120 and supported thereby. Accordingly, the temperature of the heated air flowing through the opening 124 from the spaces 119 in the air director 117 controls the amount of fuel supplied through the nozzle 80 (see FIG. 11) to the burner body 59 where combustion occurs. Thus, if the temperature of the heated air increases beyond that desired, the expansion of the fluid within the capillary tube 152 (see FIG. 13) opens the fuel control valve 147 to allow by pass of more of the fuel to the tank 14 and less supply of fuel to the nozzle 80. A decrease in the temperature of the heated air reduces the flow through the fuel control valve 147 to allow more fuel to flow through the nozzle 80 to the burner body 59 (see FIG. 11) to increase the temperature of the heated air.

The diesel engine 16 (see FIG. 13) is started after priming the primer pump 134 to supply sufficient fuel to the diesel engine 16 to enable starting and opening a throttle of the diesel engine 16 through pulling on a throttle control knob 160 (see FIG. 2) connected to the throttle of the diesel engine 16. It is necessary to move a start switch 161 (see FIG. 14) to its START position. In this position, a starter solenoid 162 is energized so that the batteries 50 supply current to the starter 49 to start the diesel engine 16.

Figure 14:
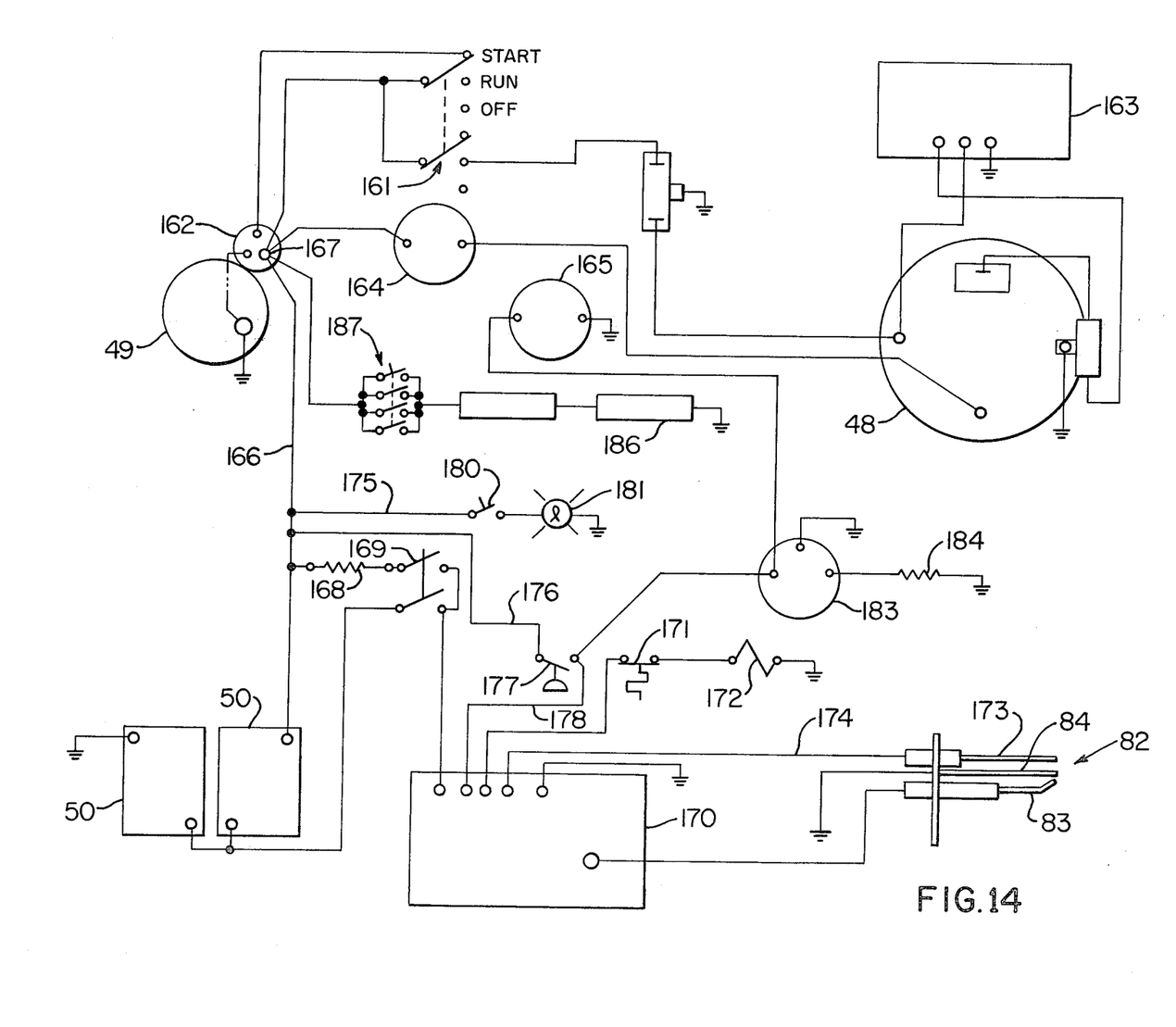
FIG. 14 is a schematic wiring diagram of the electrical circuit of the heater of the present invention.

When the diesel engine 16 starts, the start switch 161, which is a two pole switch, is moved by a spring (not shown) to its RUN position where the starter 49 is disengaged through deenergizing the starter solenoid 162. In this position, the start switch 161 connects the alternator 48 to continuously charge the batteries 50 with the voltage controlled by a voltage regulator 163. An ammeter 164 indicates the current supplied by the alternator 48. An hour meter 165 indicates how long that the diesel engine 16 (see FIG. 3) has been running.

The alternator 48 (see FIG. 14) supplies current to the batteries 50 through a line 166 from a contact 167 on the housing of the starter solenoid 162. The line 166 also supplies current through a resistor 168 and a burner switch 169, when it is closed to an ignition control panel 170. One suitable example of the ignition control panel 170 is sold by Davey Compressor Company as model 68684.

When the burner switch 169 is closed so that power is supplied to the ignition control panel 170, a high voltage current is supplied from the ignition control panel 170 to the high voltage electrode 83 to produce an arc between the electrode 83 and the ground electrode 84 provided that certain other conditions do not exist. Thus, when fuel is supplied to the burner body 59 (see FIG. 11) through the nozzle 80 when the solenoid valve 140 (see FIG. 13) is in a position to allow flow to the nozzle 80, combustion will occur within the burner body 59 (see FIG. 11).

When the burner switch 169 (see FIG. 14) is closed and a high temperature switch 171 is closed, the solenoid valve 140 (see FIG. 13) has its coil 172 (see FIG. 14) energized from the ignition control panel 170 provided that certain other conditions do not exist. The opening of the solenoid valve 140 (see FIG. 13) allows the flow of fuel from the pump 18 to the nozzle 80 to supply fuel to the interior of the burner body 59 (see FIG. 11) for ignition by the arc produced between the high voltage electrode 83 and the ground electrode 84.

Figure 8:
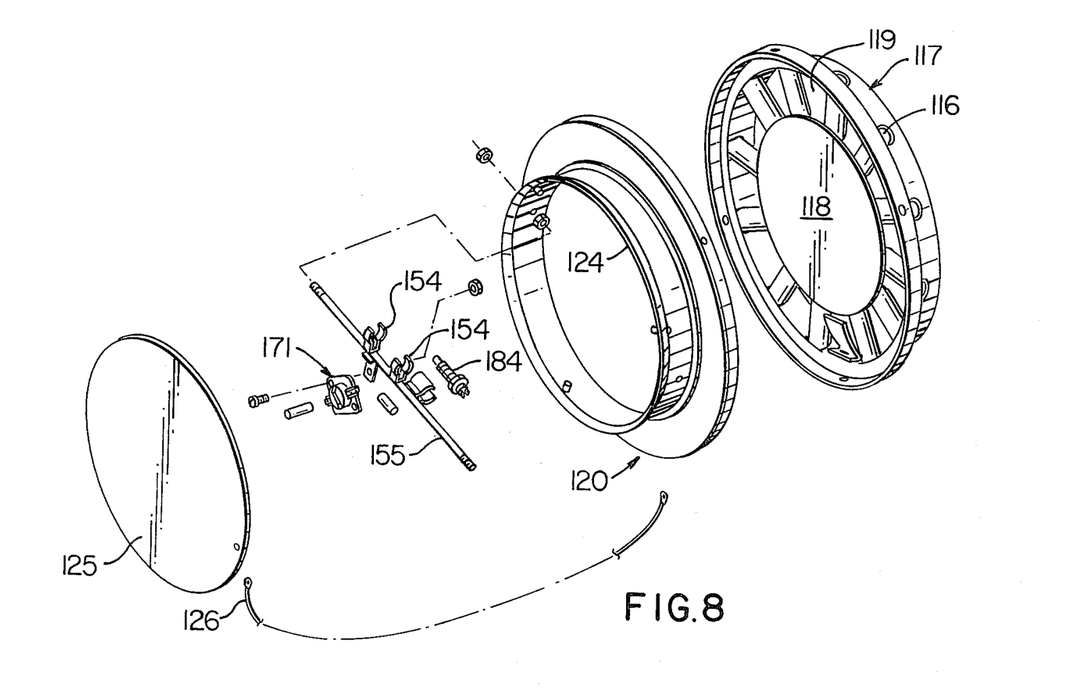
FIG. 8 is an exploded perspective view of an air director and a connector duct utilized at the discharge end of the heat exchanger of FIG. 7.

As shown in FIG. 8, the high temperature switch 171 also is mounted on the rod 155 within the opening 124 in the connector 120. Thus, when the temperature of the heated air passing through the opening 124 exceeds a predetermined value, the switch 171 opens to deenergize the coil 172 (see FIG. 14) of the solenoid valve 140 (see FIG. 13) whereby the supply of fuel to the nozzle 80 is stopped.

An electrode 173 (see FIG. 14), which is disposed adjacent the ground electrode 84 within the burner body 59 (see FIG. 11), is connected by a line 174 (see FIG. 14) to the ignition control panel 170. If there is no flame between the ground electrode 84 and the electrode 173, current will not flow therebetween so that the ignition control panel 170 will cause shut down of the high voltage current to the electrode 83 after a predetermined period of time, which is preferably seven seconds, and stop current flow to the coil 172 of the solenoid valve 140 (see FIG. 13) to shift the solenoid valve 140 to stop fuel flow to the nozzle 80. Thus, if the presence of a flame is not detected for the predetermined period of time, the flow of fuel to the nozzle 80 and the high voltage current to the electrode 83 (see FIG. 14) are stopped.

The line 166 also supplies current through a line 176, a closed air flow switch 177, and a line 178 to the ignition control panel 170. The air flow switch 177 is positioned to monitor the flow of air from the centrifugal blower 35 (see FIG. 4). The air flow switch 177 is connected through a hose and a fitting on the plenum 41 with the interior of the plenum chamber 63 to be responsive to the pressure in the plenum chamber 63.

Whenever there is no air flow from the centrifugal blower 35, the air flow switch 177 (see FIG. 14) opens. As a result, the ignition control panel 170 again stops the supply of current to the coil 172 of the solenoid valve 140 (see FIG. 13) to shift the position of the solenoid valve 140 to stop the flow of fuel to the nozzle 80 and stops the high voltage current supply to the high voltage electrode 83 (see FIG. 14) to stop the arc between the electrodes 83 and 84.

When switch 180 is closed, a light bulb 181 is energized from line 175. This illuminates all of the elements on a control panel 182 (see FIG. 2).

The closing of the air flow switch 177 (see FIG. 14) also connects the line 176 with a temperature gauge 183, which visually indicates at the control panel 182 (see FIG. 2) the temperature of the air flowing through the opening 124 (see FIG. 8) in the connector 120. The temperature gauge 183 (see FIG. 14) is activated by a transducer 184, which also is mounted on the rod 155 as shown in FIG. 8.

For low temperature starting aid, the air supplied to the diesel engine 16 (see FIG. 3) is pre-heated by an air preheater 186 (see FIG. 14). The preheater 186 is connected to the line 166 through a preheat switch 187, which must be closed to preheat the air entering the diesel engine 16 (see FIG. 3).

The frame 11 (see FIG. 1) has a towbar 190 extending forwardly from the middle thereof to enable towing of the heater 10 by a vehicle (not shown). A kickstand 191 supports the towbar 190 in a horizontal position, as shown in FIG. 1, when the towbar 190 is not connected to the towing vehicle. A pintle 192 at the middle of the rear of the frame 11 is designed to prevent towing of any other vehicle except for another of the heaters 10.

Considering the operation of the present invention, the heater 10 is towed by the towing vehicle to an area in which the heated air from the heater 10 can be supplied to the aerospace ground equipment. Then, the cover 125 (see FIG. 2) is removed from the connector 120 and one of the flexible ducts 121 is secured to the connector 120. The other of the flexible ducts 121 can be secured to the free end of the duct 121, which is connected to the connector 120. The adapter 122 also can be connected to the free end of one of the ducts 121, depending on whether there is utilization of one or both of the ducts 121, and the three flexible ducts 123 connected to the adapter 122. Of course, only one of the ducts 121 can be employed if that is all the distance that is required to supply the heated air from the heater 10 to the aerospace ground equipment.

The engine throttle control knob 160 is then pulled to fully open the throttle of the diesel engine 16. The primer pump 134 (see FIG. 13) then pumps sufficient fuel to the diesel engine 16 to enable starting of the engine 16.

The starter switch 161 (see FIG. 14) is moved to its START position to enable the starter 49 to turn over the diesel engine 16 (see FIG. 3) and cause ignition of the fuel supplied from the tank 14 (see FIG. 13) through the primer pump 134. When the diesel engine 16 starts, the spring (not shown) returns the starter switch 161 (see FIG. 14) to its RUN position to inactivate the starter 49.

After the diesel engine 16 (see FIG. 3) has stabilized, the burner switch 169 (see FIG. 14) is closed to supply power to the ignition control panel 170. This results in the ignition control panel 170 supplying high voltage current to the electrode 83 provided that the air flow switch 177 is closed due to the blower 35 supplying air as it should be since it is driven from the diesel engine 16.

The ignition control panel 170 also supplies current to energize the coil 172 of the solenoid valve 140 (see FIG.

13) so that the solenoid valve 140 has its position shifted to supply fuel through the nozzle 80 into the interior of the burner body 59 (see FIG. 11). As a result, the fuel within the burner body 59 should ignite due to the spark between the electrodes 83 and 84.

Visual observation of the flame within the burner body 59 is obtained through a transparent window 195 (see FIG. 1) in a wall 196 of the plenum 41. If the flame does not start within the predetermined period of time, which is preferably seven seconds, its absence between the electrodes 84 (see FIG. 14) and 173 prevents the supply of current along the line 174. As a result, the ignition control panel 170 stops current flow to the high voltage electrode 83 and to the coil 172 of the solenoid valve 140 (see FIG. 13).

The temperature control knob 151 (see FIG. 2) on the control panel 182 is turned until an indicator 197 indicates a proper setting at which it is desired for the heated air to be supplied from the heater 10. The indicator 197 is connected to the temperature control knob 151 by suitable means such as a gear and pinion.

The temperature setting of the knob 151 controls the amount of fuel bypassed through the fuel control valve 147 (see FIG. 13) to control the quantity of fuel supplied through the nozzle 80 to the burner body 59 (see FIG. 11). This temperature setting is maintained by the capillary tube 152 (see FIG. 13) changing the quantity of fluid passage to the diaphragm within the fuel control valve 147 if the temperature of the heated air changes from that for which the knob 151 has been set.

If the flame ceases for any reason after having begun, the ignition control panel 170 (see FIG. 14) not only stops the supply of the high voltage current to the electrode 83 but also stops the flow of current to the coil 172 of the solenoid valve 140 (see FIG. 13). This shifts the position of the solenoid valve 140 so that no diesel fuel is supplied to the nozzle 80. As previously mentioned, if there is no flame within the predetermined period of time, which is preferably seven seconds, the ignition control panel 170 (see FIG. 14) stops current flow to the electrode 83 and the coil 172 of the solenoid valve 140 (see FIG. 13).

When it is desired to shut down the supply of the heated air, it is only necessary to open the burner switch 169 (see FIG. 14). This shuts off all power to the ignition control panel 170 so that the solenoid valve 140 (see FIG. 13) is shifted to the position in which the nozzle 80 receives no fuel. This also stops the supply of high voltage current to the electrode 83 (see FIG. 14).

If the air flow from the blower 35 (see FIG. 4) should cease for any reason, then the air flow switch 177 (see FIG. 14) opens. This also causes the ignition control panel 170 to stop supply of current to the coil 172 of the solenoid valve 140 (see FIG. 13) and high voltage current to the electrode 83 (see FIG. 14).

While the present invention has shown and described the heater 10 as being utilized with aerospace ground equipment, it should be understood that it could be utilized anywhere that it is desired to have a mobile heater. Furthermore, the burner arrangement of the present invention may be utilized with many other heater assemblies.

An advantage of this invention is that it eliminates the possible contamination of the heated air by the engine by not drawing the air which is to be heated over the engine. Another advantage of this invention is that it prevents the supply of fuel to a burner when various unsafe conditions occur. A further advantage of this invention is that it avoids the build up of carbon within a diesel fuel burner.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A burner arrangement for use with a fuel supply nozzle including a body with a longitudinal axis having a hollow truncated conical portion and a hollow cylindrical portion connected to said truncated conical portion, said truncated conical portion having an opening at each axial end with the opening at its smaller end being adapted to receive fuel from a nozzle, said truncated conical portion having the opening at its larger end communicating with said hollow cylindrical portion, said truncated conical portion having lanced ports in its wall which are disposed at a nonorthogonal angle to the bodies longitudinal axis for admitting directionalized air into the interior of said truncated conical portion and producing a rotation of the air admitted through the wall to aid in burning the fuel from the nozzle along with air supplied through said opening at the smaller end of said truncated conical portion, and said hollow cylindrical portion having air port means in its wall at spaced intervals along the length of said hollow cylindrical portion to admit air into the interior of said hollow cylindrical portion to insure complete burning of the fuel supplied through said opening at the smaller end of said truncated conical portion.

2. The burner arrangement according to claim 1 in which said air port means has a greater total area than the total area of said air passage means.

3. The burner arrangement according to claim 2 in which said air passage means includes two rows of lanced ports in the wall of said truncated conical portion, each row of said lanced ports having an equal number of said lanced ports, and each row of said lanced ports being spaced from each end of said truncated conical portion and from each other.

4. The burner arrangement according to claim 3 in which said air port means includes a plurality of rows of circumferential ports in the wall of said hollow cylindrical portion, each of said rows of said ports having the same number of ports of the same size, and said rows of said ports being spaced from each other the same distance in the longitudinal direction.

5. The burner arrangement according to claim 2 in which said air port means includes a plurality of rows of circumferential ports in the wall of said hollow cylindrical portion, each of said rows of said ports having the same number of ports of the same size, and said rows of said ports being spaced from each other the same distance in the longitudinal direction.

6. A burner arrangement as recited in claim 1 wherein said directionalized air passage means are disposed at an anble to the body's longitudinal axis to cause the admitted air to rotate.

7. A burner arrangement for use with a fuel supply nozzle, comprising:
 (a) a burner housing, said housing including a generally cylindrical shaped portion with openings upon each end and an opening in its periphery which corresponds to a cylindrical sector of the generally cylindrically shaped portion; and (b) a burner body having a longitudinal axis disposed within said burner housing, said burner body having a hollow truncated conical portion and a hollow cylindrical portion connected to said truncated conical portion, said truncated conical portion having an opening at each axial end with the opening at its smaller end being adapted to receive fuel from a nozzle, said truncated conical portion having the opening at its larger end communicating with said hollow cylindrical portion, said truncated conical portion having lance ports which are disposed at a nonorthogonal angle to the bodies longitudinal axis in its wall to admit air into the interior of said truncated conical portion to aid in burning the fuel from the nozzle along with air supplied through said opening at the smaller end of said truncated conical portion, said hollow cylindrical portion having air port means in its wall at spaced intervals along the length of said hollow cylindrical portion to admit air into the interior of said hollow cylindrical portion to insure complete burning of the fuel supplied through said opening at the smaller end of said truncated conical portion, said burner housing serving to block direct air impingement of the burner body except through said opening corresponding to a cylindrical sector of the generally cylindrically shaped portion of the burner housing.

8. A burner arrangement as recited in claim 7 wherein said opening in the periphery of housing wall which corresponds to a cylindrical sector of the cylindrically shaped portion of the burner housing corresponds to substantially 90° of the housing's periphery.

9. A burner arrangement as recited in claim 7 wherein said directionalized air passage means are disposed at an angle to the body's longitudinal axis to cause the admitted air to rotate.

* * * * *